(12) United States Patent
Pereira et al.

(10) Patent No.: US 7,917,858 B2
(45) Date of Patent: Mar. 29, 2011

(54) ENGINE FOR RENDERING WIDGETS USING PLATFORM-SPECIFIC ATTRIBUTES

(75) Inventors: Mindy Pereira, Mountain View, CA (US); George Nachman, San Francisco, CA (US); Judy Liu, San Francisco, CA (US); Audrey Muller, San Francisco, CA (US); Robert Haitani, Menlo Park, CA (US); David Champlin, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1183 days.

(21) Appl. No.: 11/450,048

(22) Filed: Jun. 9, 2006

(65) Prior Publication Data

US 2007/0288858 A1 Dec. 13, 2007

(51) Int. Cl.
*G06F 13/00* (2006.01)
*G06F 3/00* (2006.01)

(52) U.S. Cl. .................................. 715/762; 715/810

(58) Field of Classification Search .......... 715/762–768, 715/802–808, 810, 866
See application file for complete search history.

(56) References Cited

U.S. PATENT DOCUMENTS

| 6,163,878 | A  | * | 12/2000 | Kohl ............................. 717/100 |
| 6,268,017 | B1 | * | 7/2001  | Takeuchi et al. ............. 427/125 |
| 6,336,137 | B1 | * | 1/2002  | Lee et al. ...................... 709/219 |
| 6,405,364 | B1 | * | 6/2002  | Bowman-Amuah .......... 717/101 |
| 7,152,228 | B2 | * | 12/2006 | Goodwin et al. ............ 717/146 |
| 7,546,543 | B2 | * | 6/2009  | Louch et al. ................. 715/762 |
| 2002/0049788 | A1 | * | 4/2002 | Lipkin et al. ................. 707/513 |
| 2002/0057803 | A1 | * | 5/2002 | Loos et al. .................... 380/270 |

* cited by examiner

*Primary Examiner* — Cao(Kevin) Nguyen
(74) *Attorney, Agent, or Firm* — Fenwick & West LLP

(57) ABSTRACT

A widget engine renders widgets using operating system platform-specific attributes. A widget application written at least partly in platform non-specific code is rendered by the widget engine through a series of system calls and callbacks. Upon interpreting particular code, the widget engine issues a system call to a module for performing a particular type of action. The module, based on the operating system platform, calls a platform-specific library that specifies how to carry out the action according to the operating system platform. Thereafter, using the returned platform-specific data, the widget engine renders the widget.

22 Claims, 8 Drawing Sheets

ENGINE FOR RENDERING WIDGETS USING PLATFORM-SPECIFIC ATTRIBUTES

BACKGROUND

As well known, computer systems (e.g., personal computers, laptops, handheld computing devices, cellular phones) allow users to perform tasks and receive services using one or more various types of computer applications. For example, commonly used and prominent computer applications relate to word processing, electronic mail services, portable document viewing and editing, spreadsheets, graphics packages, and Internet browsers. Such applications, referred to herein as "mainstream applications," are generally commercial in nature and complexly coded by teams of developers over relatively long periods of time.

One type of mainstream application that has become almost universal among computer systems is the Internet browser (e.g., Internet Explorer® by Microsoft Corporation, Safari™ by Apple Computer, Inc., Blazer® by Palm, Inc., Firefox® by Mozilla Corporation, Opera™ by Opera Software ASA). As the number of computer systems having access to the Internet continues to grow, users are becoming increasingly accustomed to the availability of real-time information accessible via Internet browsers. Those skilled in the art will recognize that the amount of real-time information available on the Internet is virtually boundless. For example, using their Internet browser, a user can retrieve real-time weather information, news, stock prices, sports scores, and traffic conditions.

Using a mainstream Internet browser application to access information on the Internet generally requires the user to open up the Internet browser, search for or enter an address of a website, wait for the website to load, and then click on links or otherwise navigate through the website for the desired information. In an effort to streamline this process, mini-applications have been made available to allow a user to see real-time Internet-based information on his/her "desktop." Such mini-applications have become to be known in the art as "widgets."

Widgets are generally not considered mainstream applications in that they are not commercial in nature and are typically created by individual users (or developers). In fact, those skilled in the art will recognize that one of the main features of widgets is the ability of "everyday" users to create simple applications for retrieving and showing various different types of Internet-based information.

Once a widget application has been developed, a widget engine is used to process and render the widget application. Typically, the widget engine itself does not need to be modified or configured by the widget developer in order for the widget application to work. In such a manner, large numbers of widget applications can be created by and made available to the public without the need to understand the inner-workings of a particular widget engine. Various widget engines are commercially available for download and installation (e.g., Yahoo! Widget Engine (formerly Konfabulator) by Yahoo! Inc., Dashboard by Apple Computer, Inc.).

FIG. 1 shows a typical flow process for rendering a widget. In ST10, the user codes a widget application using prescribed languages and formats (e.g., hypertext markup language (HTML), JavaScript, extensible markup language (XML), cascading style sheets (CSS)). Once the widget application has been coded, a widget engine, in ST12, processes the widget application code written in ST10. Based on the processed code, the widget engine, in ST14, renders the widget as described in code written in ST10. Further, the widget is said to be rendered "strictly" in that the appearance (e.g., layout, colors, feature shapes and sizes) of the widget adheres to the specific description set forth in the written widget application code.

SUMMARY

According to at least one aspect of one or more embodiments of the present invention, a method of rendering a widget with a computing device having a predetermined operating system platform is disclosed. The method is configured to receive program code specifying at least one of a function and a layout of the widget, where the program code is independent of the operating system platform. The method interprets the received program code and issues a system call in response to the interpreting, where the system call is for requesting a service from the operating system. The method then retrieves a user interface component specific to the operating system platform in response to the system call and renders the user interface component as at least part of the widget.

According to at least one other aspect of one or more embodiments of the present invention, a system having a predetermined operating system platform is also disclosed. The system is configured to include a first module arranged to issue a system call for a service from the operating system in response to interpreting program code for a widget application. The program code is independent of the operating system platform. The system also includes a second module arranged to call a library dependent on the system call. The second module is further arranged to pass data to the first module dependent on platform-specific data returned by the library. A user interface component of the widget application is renderable using the first module dependent on the data passed by the second module.

According to at least one other aspect of one or more embodiments of the present invention, a computer-readable medium having instructions stored therein that are executable by a processor. The instructions, when executed by the processor, cause the processor to receive program code specifying at least one of a function and a layout of a widget, where the program code is independent of an operating system platform of a computer system executing the instructions. The instructions also cause the processor to interpret the received program code, issue a system call in response to the interpretation (where the system call is for requesting a service from the operating system), retrieve a user interface component specific to the operating system platform dependent on the system call, and render the user interface component as at least part of the widget.

According to at least one other aspect of one or more embodiments of the present invention, a computer system having a predetermined operating system platform that includes a widget engine arranged to input program code for a widget application. The program code is non-specific to the platform. The system also includes at least one library containing platform-specific data usable for executing the program code, where a user interface component for the widget application is renderable by the widget engine using the platform-specific data.

The features and advantages described herein are not all inclusive, and, in particular, many additional features and advantages will be apparent to those skilled in the art in view of the following description. Moreover, it should be noted that the language used herein has been principally selected for

Each of the figures referenced above depict an embodiment of the present invention for purposes of illustration only. Those skilled in the art will readily recognize from the following description that one or more other embodiments of the structures, methods, and systems illustrated herein may be used without departing from the principles of the present invention.

DETAILED DESCRIPTION

In the following description of embodiments of the present invention, numerous specific details are set forth in order to provide a more thorough understanding of the present invention. However, it will be apparent to one skilled in the art that the present invention may be practiced without one or more of these specific details. In other instances, well-known features have not been described in detail to avoid unnecessarily complicating the description.

As described above, typical widget engines render widgets according to the specific appearance characteristics set forth in the written widget application code. However, such rendering may be considered undesirable and/or not optimal in that the rendered user interface (UI) for the widget does not seamlessly integrate with the particular graphical user interface (GUI) of the underlying operating system (OS) platform. In other words, for example, the typical widget for retrieving and showing weather information will look the same on a computer system running a first operating system, such as Windows® (by Microsoft Corporation), and a computer system running a second operating system, such as Palm OS by Palm, Inc.

Figure 1:
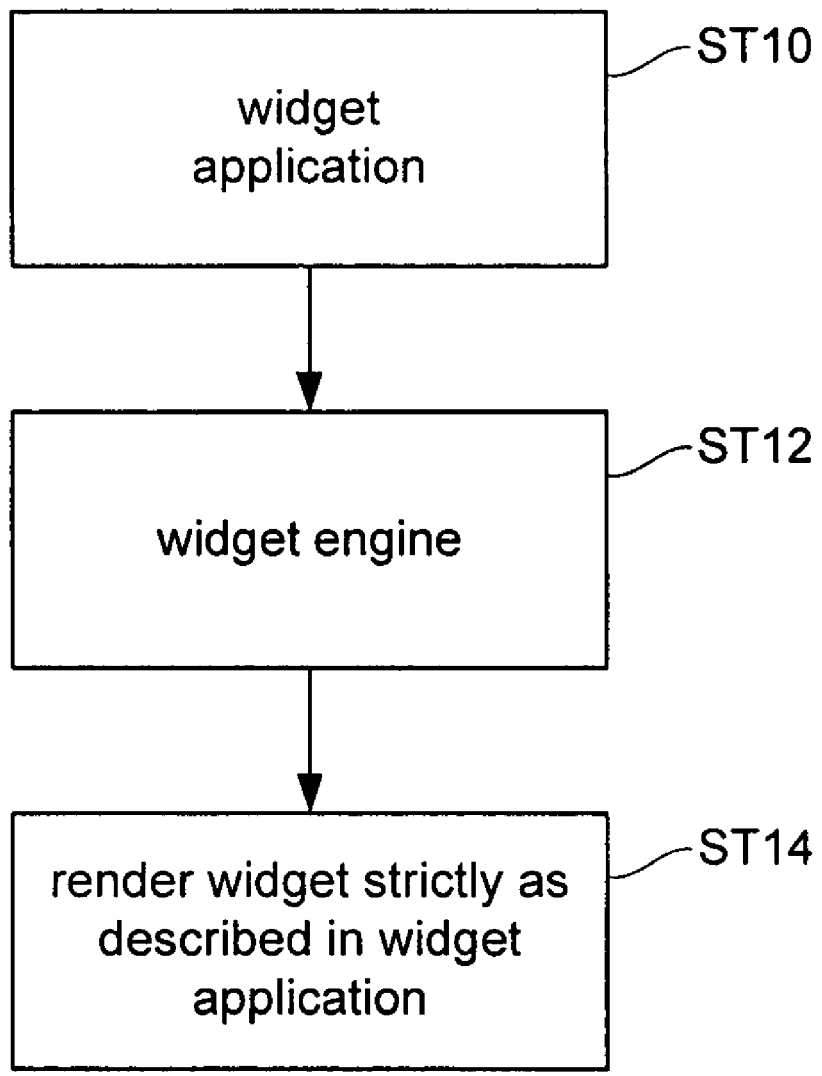
FIG. 1 shows a typical flow process for rendering a widget.
Figure 2:
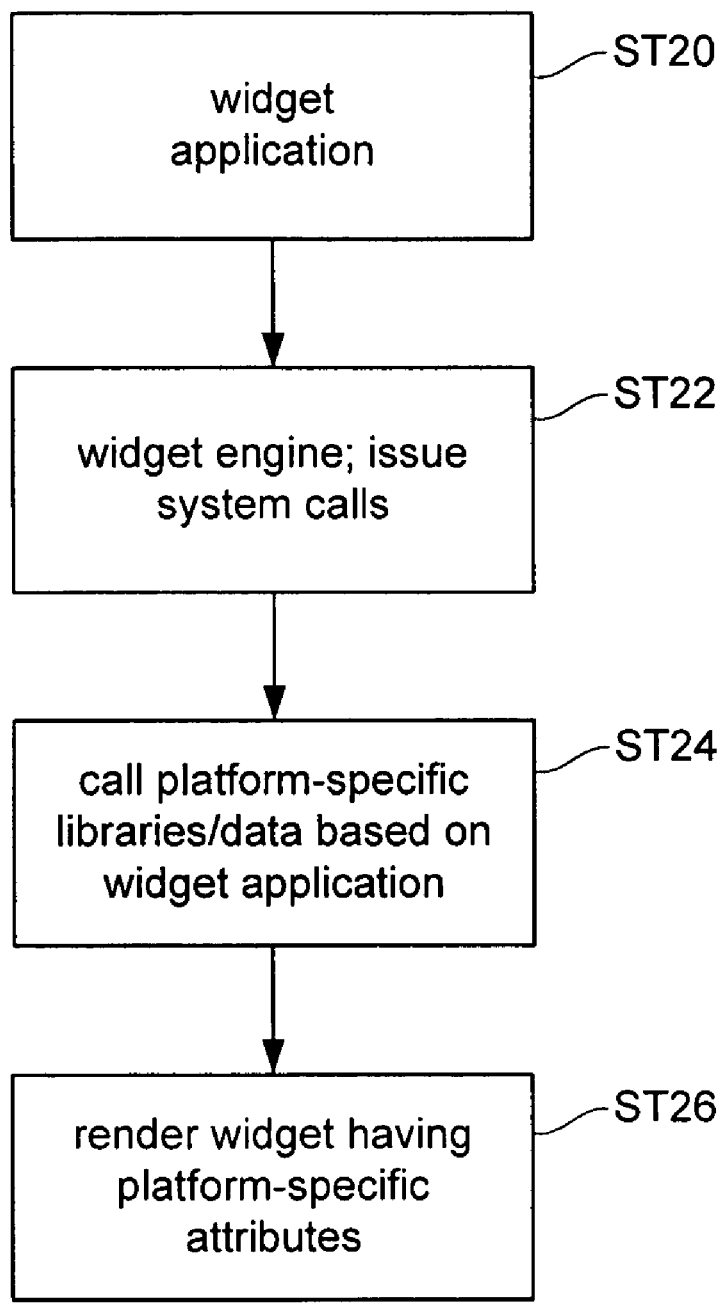
FIG. 2 shows a flow process for rendering a widget in accordance with an embodiment of the present invention.

Accordingly, at least partly to address one or more of the shortcomings associated with typical widget rendering, embodiments of the present invention relate to a widget engine configured to render widgets using platform-specific attributes. FIG. 2 shows an overall flow process for rendering a widget in accordance with an embodiment of the present invention.

In FIG. 2, the initial step, ST20, involves a user/developer writing the code for his/her desired widget application. In one or more embodiments, the widget application may be written using a combination of a scripting language (e.g., JavaScript) and a markup language (e.g., XML user interface language (XUL), K Desktop Environment HTML (KTHML)). The scripting language facilitates performing actions, and the markup language generally contains text and information (e.g., layout, styling) regarding the text. In one or more embodiments, the code used to write the widget application is not specific to operating system platforms of computer systems on which the widget application may run.

Once the widget application has been written in ST20, the widget application, in ST22, is submitted to, opened by, or imported to a widget engine. As described in more detail below with reference to FIGS. 3-5, the widget engine processes the widget application code and issues (or causes the issuance of) operating system calls to various modules. Such a widget engine may be formed of various structures and/or methods in any combination of software, firmware, and hardware. Then, in ST24, the modules, based on knowledge about the active operating system platform, call platform-specific libraries containing platform-specific mechanisms for achieving an action specified in the system call issued in ST22. Using this platform-specific information, the widget, in ST26, is rendered having platform-specific attributes. Accordingly, by way of the process shown in FIG. 2, widget application code may be effectively translated by a widget engine to a platform-specific user interface.

Figure 3:
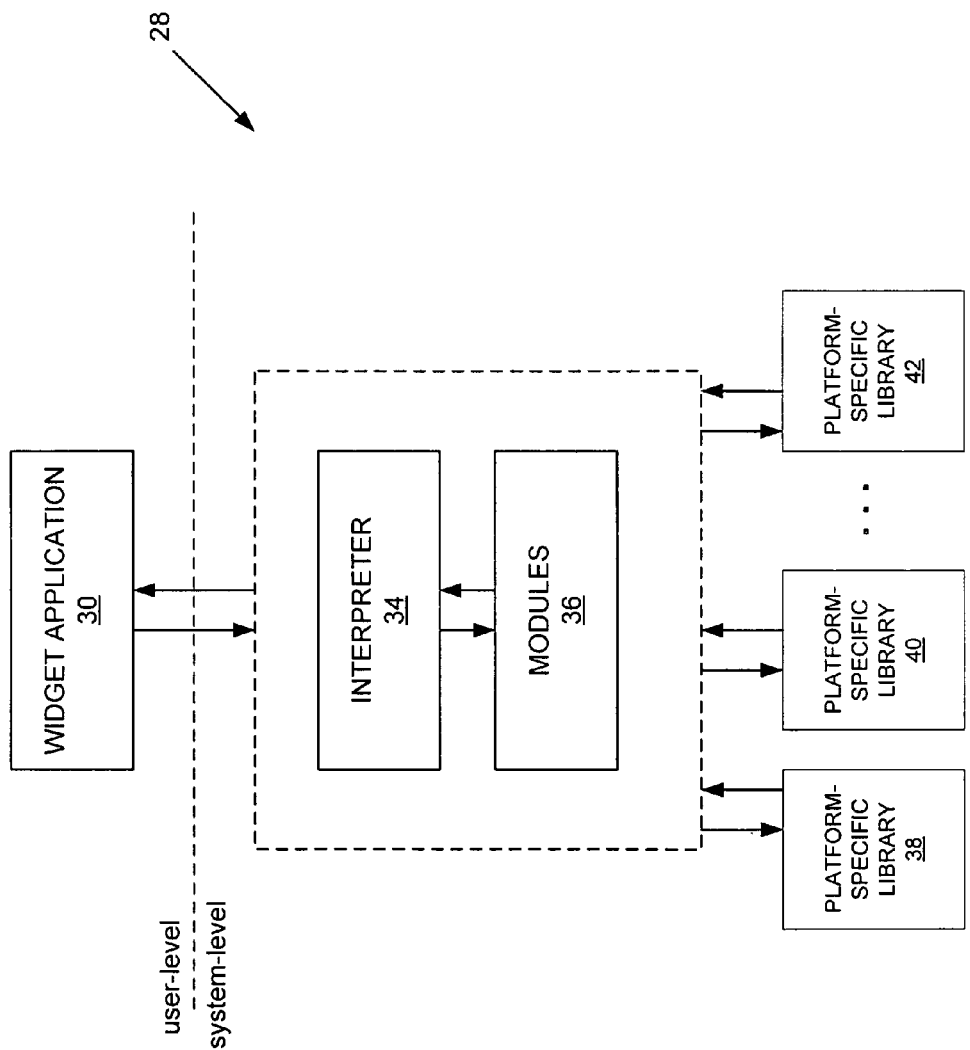
FIG. 3 shows a widget rendering architecture in accordance with an embodiment of the present invention.

FIG. 3 shows a widget rendering architecture 28 in accordance with an embodiment of the present invention. The widget rendering architecture 28 includes an interpreter 34, modules 36, and a plurality of platform-specific libraries 38, 40, 42 (where one or more of these components form a "widget engine"). Further, as shown in FIG. 3, the actual widget application 30 is considered to be present at the "user-level," whereas the interpreter 34, modules 36, and the plurality of platform-specific libraries 38, 40, 42 are "system-level" components. Those skilled in the art will note that the system-level components may be thought of as being "invisible" to the user/developer of the widget application 30.

In one or more embodiments, the interpreter 34 "interprets" the code of the widget application 30. For example, if the widget application 30 is written using JavaScript, the interpreter 34 may be a JavaScript interpreter. Such an interpreter takes strings of script code, executes the script, and issues system calls based on the executed scripts. Further, those skilled in the art will note that by using an interpreted language (as opposed to a compiled language) to write the widget application 30, compilation of the widget application 30 is not necessary every time the code for the widget application 30 is modified.

The system calls issued by the interpreter 34 are directed to particular ones of the modules 36. In general, each of the modules 36 is responsible for a certain type of action (described in more detail below with reference to FIG. 4). Further, the modules 36 may be configured to detect what operating system is currently running. For example, if a system call requests to write data, the system call may be directed to a data storage module that then, based on the type of the current operating system, causes the data to be written to a storage device using a format of the running operating system.

Further, based on the type of action needing to be carried out by one of the modules 36, the module 36 may access one of the platform-specific libraries 38, 40, 42. Each of the platform-specific libraries 38, 40, 42 generally contains functions and data that are specific to a particular type of operating system. When one of the modules 36 needs to perform an action in a platform-specific manner, the module 36 calls on its corresponding platform-specific library 38, 40, or 42 to detail the execution of the desired action. For example, if a system call from the interpreter 34 to a particular module 36 designates the action "draw button," that module 36 then calls on a "draw button" library specific to the running operating system. The library registers with the module 36, and through a series of callback operations, specifies to the module 36 how to draw the button in accordance with the GUI guidelines, settings, preferences, and/or characteristics of the running operating system. The module 36 then causes the button to be rendered. Thus, in such a manner, the rendered button has platform-specific attributes.

As described above, the use of the platform-specific libraries 38, 40, 42 is important to ensure platform-specific rendering. For example, to ensure that a system's GUI background color is properly rendered, the color may be selected via an application program interface (API) using, for example, a function GetDefaultwindowBackgroundColor( ).

Further, the platform-specific libraries 38, 40, 42 may not only be used for platform-specific rendering, but may also be used to platform-specific actions. For example, those skilled in the art will note that different operating systems access the Internet using different protocols. However, in one or more embodiments, the widget user/developer does not need to know these different protocols and may simply rely on the platform-specific libraries 38, 40, 42 to carry out actions generally described actions in his/her code according to the proper operating system protocol.

Further, the provider of the widget engine or a team of developers may add, remove, and/or modify any of the platform-specific libraries 38, 40, 42 in order to modify an overall functionality or capability of the widget rendering architecture 28. For example, should operations and/or characteristics of a particular operating system change, one or more of the platform-specific libraries 38, 40, 42 may be modified accordingly in order to be consistent with the changed operating system. As such modification occurs at the system-level, the widget user/developer need not be aware of the operating system changes.

Figure 4:
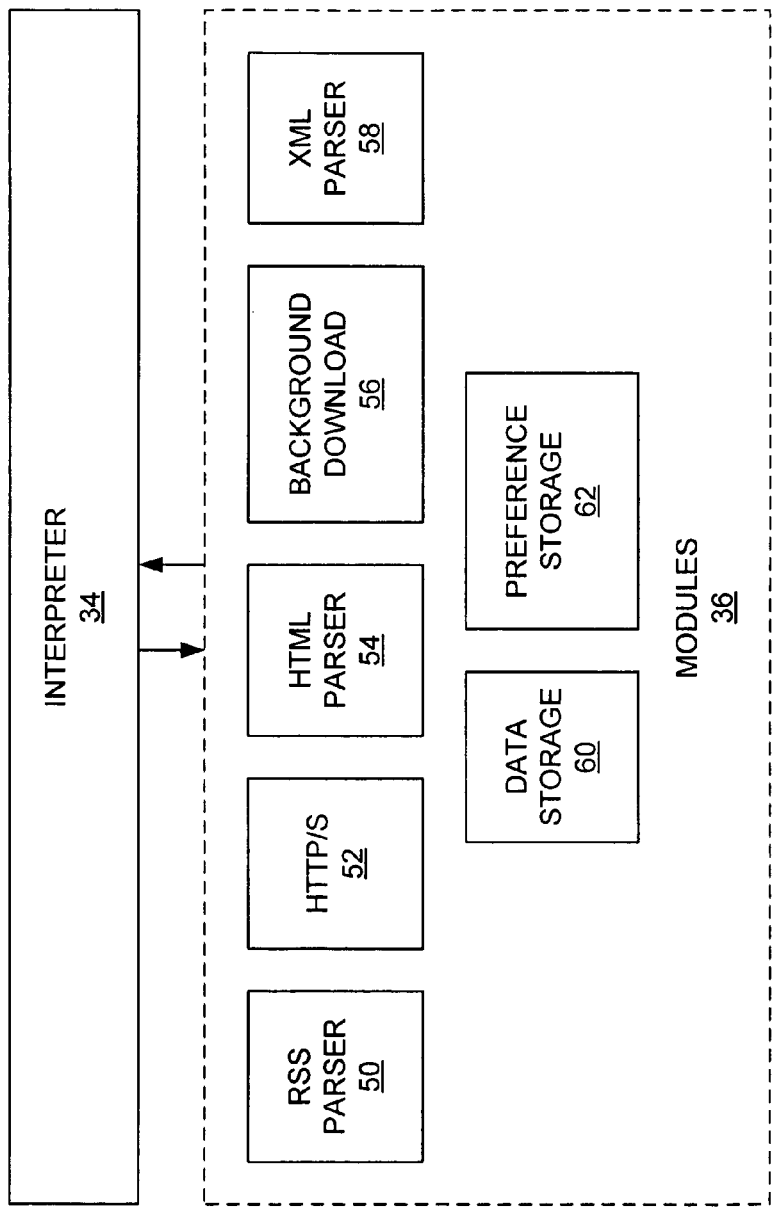
FIG. 4 shows a widget engine in accordance with an embodiment of the present invention.

FIG. 4 shows a widget engine in accordance with an embodiment of the present invention. As described above, the widget engine has the interpreter 34 for effectively translating widget application code to a plurality of system calls. The system calls may be directed to any one or more of the various modules 36 now described below. As used herein, a "module" refers to any program logic or functionality implemented in software and/or hardware.

In one or more embodiments, the widget engine may include a rich site summary (RSS) module 50. Those skilled in the art will note that RSS refers to a file format for website feeds. RSS feeds generally contain continuously updated news headlines and articles. RSS feeds are typically provided to a user via "news aggregators," which may be standalone applications or extensions to mainstream Internet browser applications. Referring to FIG. 4, when the interpreter 34 issues a system call to the RSS module 50 for retrieving/displaying RSS feeds, the RSS module 50 calls the appropriate platform-specific library (not shown) for specifying how the RSS feeds are to be retrieved using the functionality of the current operating system. The RSS module 50 then passes to the interpreter 34 the RSS feeds obtained according to the platform-specific RSS feed retrieval process.

Further, in one or more embodiments, the widget engine may include a hypertext transfer protocol (HTTP) module 52. In general, the HTTP module 52 is responsible for handling actions involving the Internet. The HTTP module 52 is passed a system call when the interpreter 34 requires a data connection to the Internet. The HTTP module 52, possibly using one or more platform-specific libraries (not shown), is configured to establish a connection to the Internet. In some cases, the HTTP module 52 may be required to establish a secure connection (e.g., HTTPS) to the Internet. Those skilled in the art will note that connecting to the Internet is a highly platform-specific process. Accordingly, by storing the functionality of how to connect to the Internet in the HTTP module 52 (and its platform-specific libraries (not shown)) "away from" the widget user/developer, the user/developer may simply code his/her widget application to generally request certain information from the Internet.

Further, in one or more embodiments, the widget engine may include an HTML parser module 54 (described in more detail below with reference to FIG. 5). In general, the HTML parser module 54 is used to specify how user interfaces are to be rendered. For example, when the interpreter 34 receives code requesting a certain "draw" action, the interpreter 34 issues a system call to the HTML parser module 54. The HTML parser module 54, based on one or more platform-specific libraries (not shown), parses through HTML code returned by the platform-specific libraries and passes formatted data (e.g., via data arrays) for performing the draw action to the interpreter 34. This data is then used by the interpreter 34 to complete the execution of the "draw" action.

Further, in one or more embodiments, the widget engine may include a background download module 56. In general, the background download module 56 is configured to schedule information downloading. For example, a user/developer may select to see weather information at particular times of the day. To facilitate such, the background download module 56 automatically causes at those particular times the download of particular information according to the running operating system. Accordingly, by storing the functionality of how to download background information in the background download module 56 (and its platform-specific libraries (not shown)) "away from" the widget user/developer, the user/developer may simply code his/her widget application to generally request certain information from the Internet. Moreover, those skilled in the art will note that the background download module 56 provides synchronization functionality.

Further, in one or more embodiments, the widget engine may include an XML parser module 58. In general, the XML parser module 58 parses through received XML code (e.g, from an Internet website) and accordingly passes appropriate data arrays to the interpreter 34. The interpreter 34 then uses the passed data arrays to execute corresponding script code requiring an XML feed.

Further, in one or more embodiments, the widget engine may include a data storage module 60. The data storage module 60 is configured to write and read data to/from a data storage medium (not shown). More particularly, the data storage module 60 writes and reads data according to formats and protocols specified in one or more platform-specific libraries (not shown). For example, writing data in a first operating system may involve a different file type than one used when writing data in a second operating system. Accordingly, the data storage module 60 ensures the proper writing/reading of data in one or more particular operating systems. Accordingly, by storing the functionality of how to store data in the data storage module 60 (and its platform-specific libraries (not shown)) "away from" the widget user/developer, the user/developer may simply code his/her widget application to save/retrieve data.

Further, in one or more embodiments, the widget engine may include a preference storage module 62. The preference storage module 62 is configured to store user preferences. For example, a user/developer may specify that his/her home address be used as the destination location for mapping purposes regardless the location of a computer system in accordance with one or more embodiments. Using the preference storage module 62, the user/developer may store preferences using simple and general scripting non-platform-specific commands.

Further, in one or more embodiments, the widget engine may include a notifications module (not shown). A rendered widget may be associated with the notifications module. Although such a notifications module is platform-specific, the developer need not know the platform-specific attributes when designing his/her widget.

Further, a widget developed and rendered via one or more of the modules described above may be integrated with personal information management (PIM) applications. For example, a widget's functionality or presentation may be dependent on or responsive to personal data such as, for example, contact information, calendar information, location information, e-mail, and user preferences.

Further, in one or more embodiments, a widget may be rendered or provided with metadata that facilitates discovery of the widget. Moreover, a widget in accordance with one or more embodiments may be auto-discovered based on, for example, search engine queries.

Further, although modules 50, 52, 54, 56, 58, 60, 62 have been described individually above, any combination of the modules 50, 52, 54, 56, 58, 60, 62 may be used together or in data connection with one another. For example, the RSS module 50 may rely on the HTML parser module 54 to properly render the display of particular RSS feeds.

Figure 5:
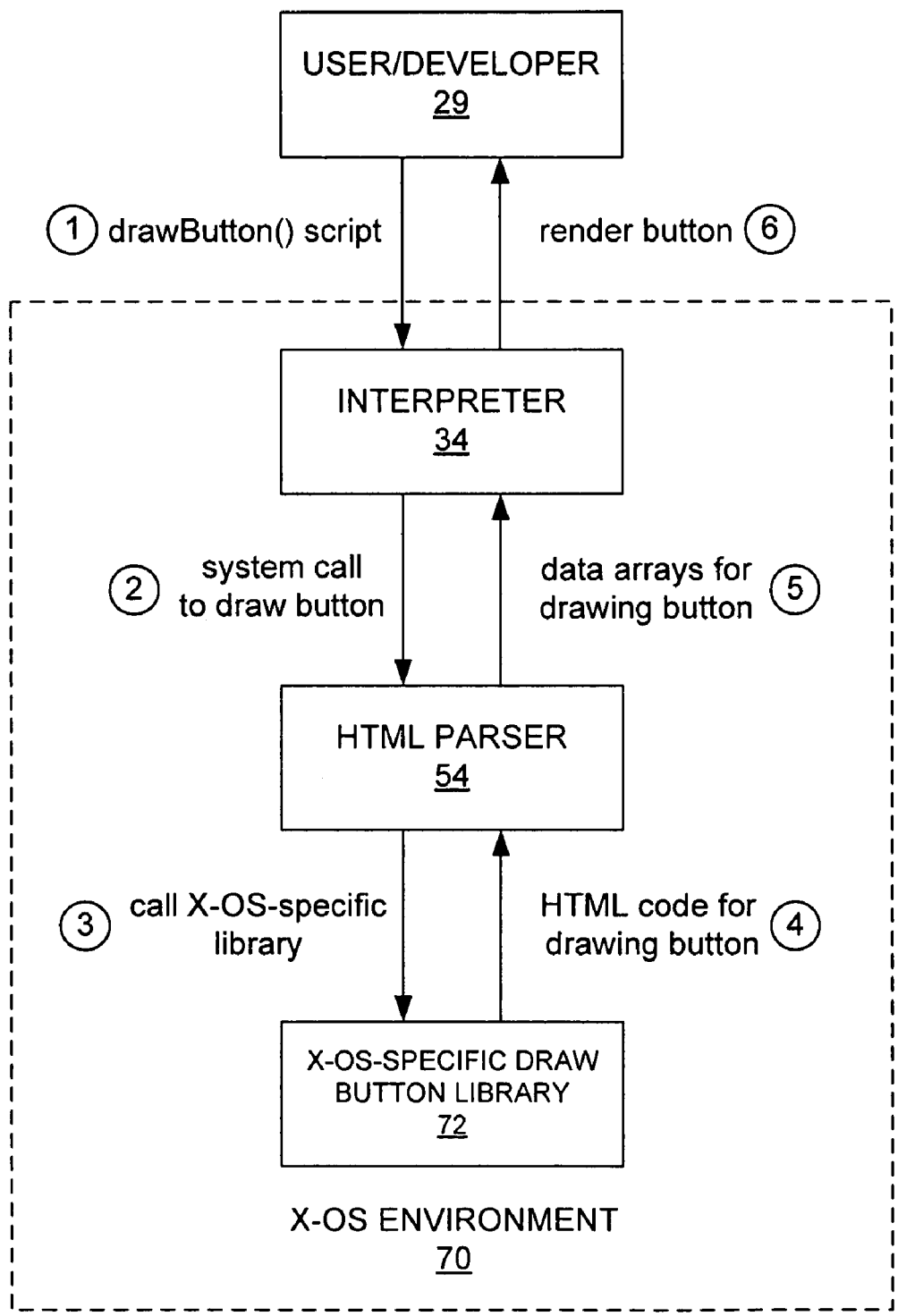
FIG. 5 shows an instruction/command/data flow process in accordance with an embodiment of the present invention.

To illustrate an operation of the widget rendering architecture 28, FIG. 5 shows an example of instruction/command/data flow among a user/developer 29, the interpreter 34, the HTML parser module 54, and an X-OS-specific library 72. Further, as shown in FIG. 5, the interpreter 34, the HTML parser module 54, and the X-OS-specific library 72 operate in an X-OS environment 70. In other words, FIG. 5 shows a process for rendering a widget on an X-OS computing platform.

Initially, the user/developer 29 writes a drawButton( ) script to draw a button for his/her widget application. This script is passed to the interpreter 34, which interprets the script and issues a system to the HTML parser module 54. The HTML parser module 54, recognizing the current operating system, calls the X-OS-specific library 72 for drawing the button according to the X-OS computing platform. The X-OS-specific library 72, in response, returns to the HTML parser module 54 the HTML code for drawing the button according to the X-OS computing platform. The HTML parser module 54 then parses through the returned HTML code and passes to the interpreter 34 data arrays for drawing the button. The interpreter 34 completes execution of the drawButton( ) script by causing the requested button to be rendered. As such, the drawn button is rendered using and having platform-specific attributes.

Figures 6, 7:
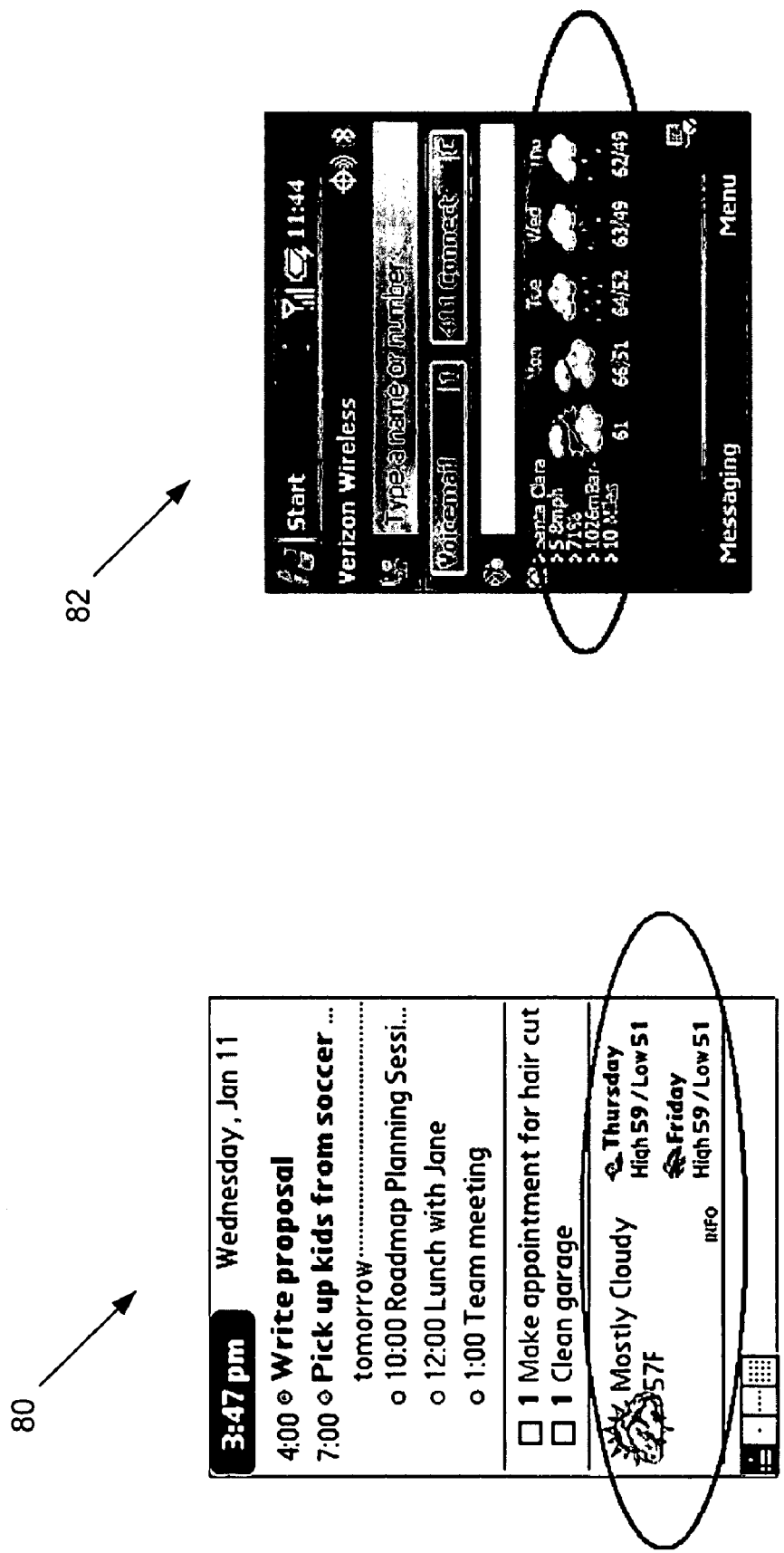
FIG. 6 shows a screenshot in accordance with an embodiment of the present invention.
FIG. 7 shows a screenshot in accordance with an embodiment of the present invention.

As described above with reference to FIG. 5, a widget component is rendered using platform-specific attributes. In other words, the same widget application may result in two different rendered widgets—at least in terms of appearance—on two different operating system platforms, without having to recompile the same program for different platforms. For example, FIGS. 6 and 7 show screenshots 80, 82 of weather widgets rendered using the same underlying widget application (the circled areas showing the locations of the respective weather widgets).

Figure 9:
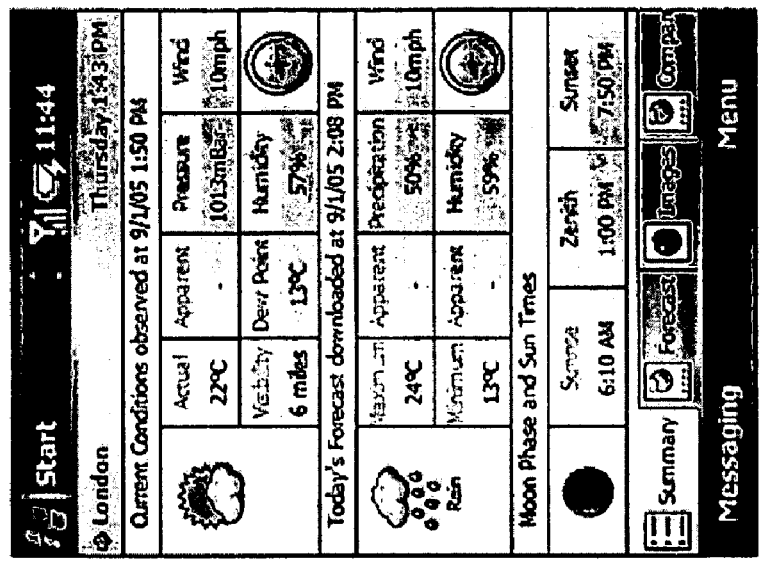
FIG. 9 shows a screenshot in accordance with an embodiment of the present invention.
Figure 8:
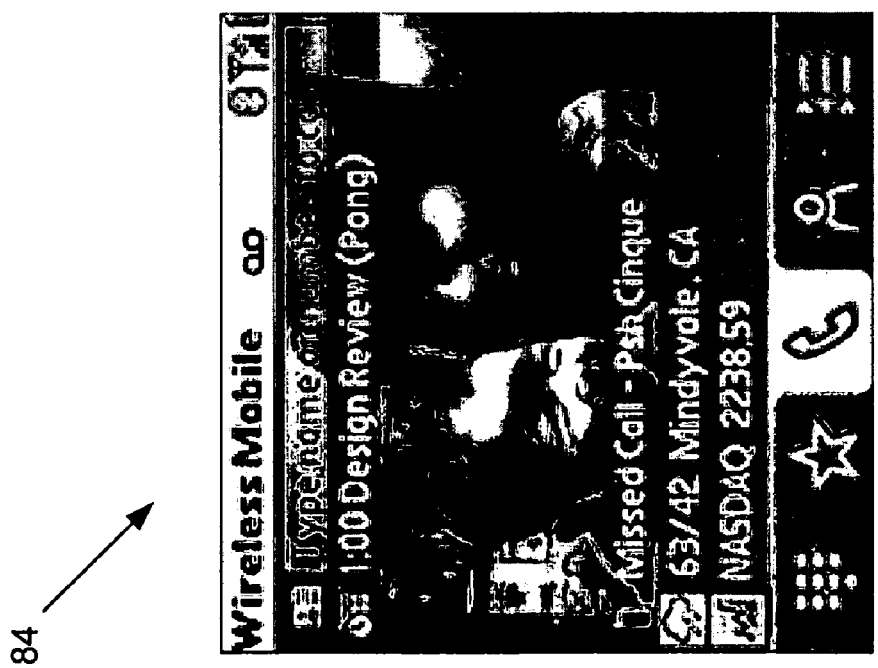
FIG. 8 shows a screenshot in accordance with an embodiment of the present invention.

Widgets in accordance with one or more embodiments of the present invention may be rendered in one or more of various ways in terms of location on a display. Such rendering may be at least partly dependent on the HTML parser module 54 (described above with reference to FIG. 4). In one or more embodiments, a widget may be "pinned" to a certain location of GUI display. For example, as shown in the screenshot 84 of FIG. 8, weather, location, and stock market information is fixed at the location shown. Further, in one or more embodiments, a widget may be displayed over the full screen. For example, as shown in the screenshot 86 of FIG. 9, a weather widget consumes an entire screen of the display. Those skilled in the art will note that the amount of information that can be presented via a widget may depend on whether it is pinned or full screen.

Further, in one or more embodiments, widgets applications may be event-driven Such event-driven widgets may be rendered at least partly using, for example, the preference storage module 62 (described above with reference to FIG. 4). For example, an event-driven scheme may specify that a weather widget (e.g., 80 or 82) be rendered in the evenings and early mornings, a stock market widget be rendered on weekday late mornings and early afternoons, and a sports score widget be rendered in the late afternoons and late evenings. Further, in one or more embodiments, widgets may be driven based on internal events. Such timing of widgets may be specified by the widget developer using, for example, a provided scheduler. Moreover, the timing of widgets may be specified by the widget user.

Further, one or more embodiments described above may be associated with virtually any type of computer system, including multiprocessor and multithreaded uniprocessor systems, regardless of the operating system platform being used. Further, the computer system associated with one or more embodiments may be a handheld computing device (e.g., a personal digital assistant (PDA)). For example, it is noted that in one or more embodiments, the computer system may have a form factor of a handheld computing device (e.g., a Palm® TREO™, Blackberry™ by Research in Motion (RIM), Nokia® E61).

Figure 10:
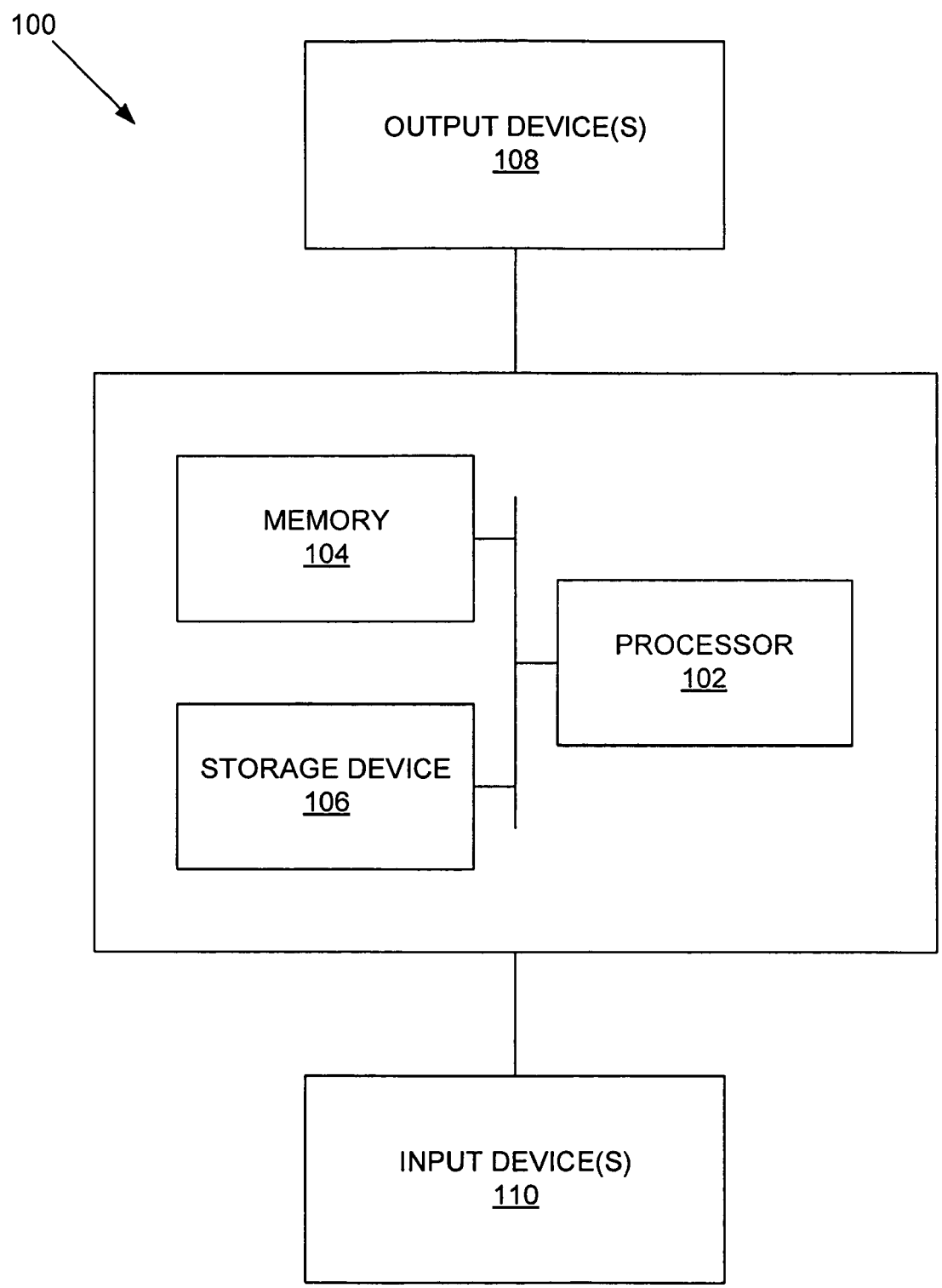
FIG. 10 shows a computer system in accordance with an embodiment of the present invention.

As shown in FIG. 10, a computer system 100 according to one or more embodiments includes at least one processor (e.g., a general-purpose processor, a field-programmable gate array (FPGA), an application-specific integrated circuit (ASIC), a graphics processor) 102, associated memory (e.g., random-access memory (RAM)) 104, at least one storage device (e.g., a hard disk drive, a memory card) 106, and numerous other elements (not shown) and functionalities typical of modern computer systems. Further, software or program instructions executable by the processor 102 to perform one or more embodiments of the present invention may be stored on a computer-readable medium such as the memory 104, the storage device 106, a compact disc (CD), a digital video disc (DVD), a universal serial bus (USB) drive, a "floppy" disk, a magnetic tape, or any other computer-readable storage device.

The computer system 100 may also include input devices (e.g., a keyboard, a touchpad) 108 and output devices (e.g., a liquid crystal display (LCD)) 110. Those skilled in the art will appreciate that the input and output devices may be of various forms not particularly described herein, but otherwise known to those skilled in the art. Further, the computer system 100 may be connected to a local area network (LAN) or a wide area network (WAN) via a wireless network interface connection (e.g., an 802.11-based wireless adapter, a cellular communication protocol, a wireless WAN card) (not shown).

Advantages of the present invention may include one or more of the following. In one or more embodiments, a widget may be rendering having specific-platform attributes. Further, in one or more embodiments, a widget application user/developer may not need to have knowledge of platform-specific operations/characteristics in order to effectively build and render the widget application. Further, in one or more embodiments, a widget rendering architecture may be extensible by adding, removing, and/or modifying one or more platform-specific libraries used by a widget engine of the widget rendering architecture.

Further, the features and advantages described in the specification provide a beneficial use to those making use of a system and a method as described in embodiments herein. For example, a user is provided mechanisms, e.g., by receiving and/or transmitting control signals, to control access to particular information as described herein. Further, these benefits accrue regardless of whether all or portions of components, e.g., server systems, to support their functionality are located locally or remotely relative to the user.

Numerous specific details have been set forth above to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

In addition, some portions of the detailed description have been presented above in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

Some embodiments may have been described above using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Unless specifically stated otherwise above, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

As used above, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

While the invention has been described with respect to a limited number of embodiments, those skilled in the art, having benefit of the above description, will appreciate that other embodiments may be devised which do not depart from the scope of the present invention as described herein. Accordingly, the scope of the present invention should be limited only by the appended claims.

What is claimed is:

1. A method of rendering a widget with a mobile computing device having a predetermined operating system platform, comprising:
    receiving program code specifying a layout of the widget, the program code being independent of the operating system platform;
    identifying the predetermined operating system platform of the mobile computing device from a plurality of operating system platforms;
    interpreting the received program code;
    issuing a system call in response to the interpreting, the system call for requesting a service from the operating system platform;
    retrieving a user interface component specific to the identified operating system platform in response to the system call by calling an extensible library for the user interface component and retrieving a response from the extensible library;
    rendering the user interface component as at least part of the widget based at least in part on the response from the extensible library; and
    parsing a rich site summary (RSS) feed required by the widget.

2. The method of claim 1, wherein the mobile computing device is a handheld mobile computing device.

3. The method of claim 1, wherein the received program code comprises at least one of JavaScript code, XML code, XUL code, HTML code, and KHTML code.

4. The method of claim 1, wherein the response from the extensible library comprises code, and wherein the retrieving the user interface comprises:
    parsing through the returned code;
    arranging data in response to the parsing; and
    satisfying the system call with the arranged data.

5. The method of claim 1, wherein the widget is fixed at a location on a display of the mobile computing device.

6. The method of claim 1, wherein the widget is rendered on a full screen of a display of the mobile computing device.

7. The method of claim 1, wherein the widget is event-driven based on at least one of a time, a date, a day of week, and a location.

8. A system having a predetermined operating system platform, comprising:
    a first module arranged to issue a system call for a service from the operating system platform in response to interpreting program code for a widget application, the program code being independent of the operating system platform;

a second module arranged to (1) identify the predetermined operating system platform of the system from a plurality of operating system platforms and (2) call an extensible library specific to the identified operating system platform dependent on the system call and retrieve a response from the extensible library for the call, the response comprising data specific to the identified operating system platform, wherein the second module is further arranged to pass data to the first module dependent on the data specific to the identified operating system platform returned by the extensible library; and a third module arranged to parse a rich site summary (RSS) feed required by the widget application, and wherein a user interface component of the widget application is renderable using the first module dependent on the data passed by the second module.

9. The system of claim 8, the second module comprising:
a module arranged to connect the system to the Internet for data required by the widget application.

10. The system of claim 8, the second module comprising:
a module arranged to parse received hypertext markup language (HTML) code.

11. The system of claim 8, the second module comprising:
a module arranged to download background data for the widget application.

12. The system of claim 8, the second module comprising:
a module arranged to parse received extensible markup language (XML) code.

13. The system of claim 8, the second module comprising:
a module arranged to at least one of write to and read from a data storage medium.

14. The system of claim 8, the second module comprising:
a module arranged to store at least one user preference for the widget application.

15. A computer-readable medium having stored therein instructions to:
receive program code specifying a layout of a widget, the program code being independent of an operating system platform of a computer system executing the instructions;
identify the operating system platform of the computer system from a plurality of operating system platforms;
interpret the received program code;
issue a system call in response to the interpretation, the system call for requesting a service from the operating system platform;
retrieve a user interface component specific to the identified operating system platform in response to the system call by calling an extensible library for the user interface component and retrieving a response from the extensible library for the calling;
render the user interface component as at least part of the widget based at least in part on the response from the extensible library; and parse a rich site summary (RSS) feed required by the widget.

16. The computer-readable medium of claim 15, wherein the mobile computing device is a handheld mobile computing device.

17. The computer-readable medium of claim 15, wherein the received program code comprises at least one of JavaScript code, XML code, XUL code, HTML code, and KHTML code.

18. The computer-readable medium of claim 15, wherein the response from the extensible library comprises code, and the computer-readable medium further comprising instructions to:
parse through the returned code;
arrange data in response to the parsing; and
satisfy the system call with the arranged data.

19. The computer-readable medium of claim 15, wherein the widget is fixed at a location on a display of the mobile computing device.

20. The computer-readable medium of claim 15, wherein the widget is rendered on a full screen of a display of the mobile computing device.

21. The computer-readable medium of claim 15, wherein the widget is event-driven based on at least one of a time, a date, a day of week, and a location.

22. A computer system having a predetermined operating system platform, comprising:
a widget engine arranged to input program code for a widget application, the program code being non-specific to the predetermined operating system platform;
an interpreter arranged to (1) interpret the input program code and (2) issue a system call in response to the interpretation, the system call for requesting a service from the operating system platform;
a first module arranged to identify the predetermined operating system platform of the computer system from a plurality of operating system platforms;
a second module arranged to parse a rich site summary (RSS) feed required by the widget application; and
at least one library containing data specific to the identified operating system platform usable for executing the program code,
wherein, in response to the system call, a user interface component for the widget application is retrieved by calling one of the at least one library for the user interface component and a response from the library is retrieved for the calling, the user interface component renderable by the widget engine based at least in part on the response from the library, the response comprising the data specific to the identified operating system platform.

* * * * *